US005449238A

United States Patent [19]

Pham et al.

[11] Patent Number: 5,449,238

[45] Date of Patent: Sep. 12, 1995

[54] METHOD FOR OPERATING A RECORDING DEVICE POWERED BY AT LEAST ONE RECHARGEABLE ACCUMULATOR

[75] Inventors: Ngoc Q. Pham; Walter Eiler; Friedrich-Wilhelm Drees; Mohamed Al-Khatib; Wolfgang Pekruhn, all of Berlin, Germany

[73] Assignee: Eastman Kodak Company, Rochester, N.Y.

[21] Appl. No.: 855,023

[22] PCT Filed: Nov. 2, 1989

[86] PCT No.: PCT/DE89/00699

§ 371 Date: Apr. 15, 1994

§ 102(e) Date: Apr. 15, 1994

[87] PCT Pub. No.: WO91/06430

PCT Pub. Date: May 16, 1991

[51] Int. Cl.$^{6}$ .......... B41J 29/38; H02J 7/00

[52] U.S. Cl. .......... 400/54; 400/88; 320/43; 364/707

[58] Field of Search .......... 400/54, 83, 120, 120.12; 364/707, 708, 708.1; 320/43; 200/43.01, 43.02, 43.04

[56] References Cited

U.S. PATENT DOCUMENTS

| | | | |
|---|---|---|---|
| 4,143,417 | 3/1979 | Wald et al. | 364/900 |
| 4,455,523 | 6/1984 | Koenck | 320/43 |
| 4,903,222 | 2/1990 | Carter et al. | 364/708 |
| 4,998,055 | 3/1991 | Nash et al. | 320/2 |
| 5,381,043 | 1/1995 | Kohiyama et al. | 364/707 |
| 5,383,140 | 1/1995 | Nanno et al. | 364/707 |

*Primary Examiner*—David A. Wiecking
*Assistant Examiner*—Steven S. Kelley
*Attorney, Agent, or Firm*—Kenyon & Kenyon

[57] ABSTRACT

In order to reduce the power requirement of the recording device (1) and thereby to achieve long operating readiness, the recording device (1) is placed in a stand-by state (Z3) during phases when recording is inactive, in which state its control electronics (22) function in power-saving mode. When a charger (3) is connected, the accumulator (2) is charged. The recording device (1) is placed into an operative state (Z4), if the accumulator (4) has a sufficient charge. To further reduce the power requirement, the recording device (1), from the stand-by state (Z3, is separated from the accumulator (2) by opening an electric switch (12), if it has remained in the stand-by state for a certain period of time. The state of charge of the accumulator (2) is monitored, and if it falls below a certain level and the charger (3) is disconnected, the recording device (1) is placed into the electrically shut off state (2), and if the charger (3) is connected, it is placed into the stand-by state (Z3).

25 Claims, 2 Drawing Sheets

METHOD FOR OPERATING A RECORDING DEVICE POWERED BY AT LEAST ONE RECHARGEABLE ACCUMULATOR

BACKGROUND OF THE INVENTION

A recording device formed as a thermal printer is known from DE-PS 32 02 185. Such a recording device demonstrates a high peak power requirement during the recording process. To cover this peak power requirement, providing a corresponding high-performance power pack is possible. However, such a high-performance component would significantly increase the overall costs of the recording device. If accumulators, which are perfectly capable of giving off large amounts of power for a short time, are used in the known thermal printer as a power source, the number of possible recording processes is limited by the lifetime (i.e. the capacity) of the accumulators. To maintain uniform printing quality with a decreasing performance capacity of the accumulators, the printing parameters must be adapted. Such an adaptation takes place in the thermal printer known from DE-PS 32 02 185 during the period when its heating elements are kept on. However, doing so has a disadvantageous effect on the printing speed.

When using rechargeable accumulators, a discharge beyond a certain charge state (i.e. complete discharge or deep discharge) must also be avoided, otherwise damage or destruction of these accumulators may result. The lifetime, which is limited by the number of charging cycles and the useful capacity of the accumulators, is determined to a significant extent by the discharge speed. Therefore, in a recording device powered by rechargeable accumulators, efficient use of small amounts of power is necessary for reasons of economic efficiency and recording capacity.

The present invention is therefore based on the task of creating a method for operating a recording device powered by at least one rechargeable accumulator wherein the greatest possible number of recording processes can be carried out and wherein deep discharge of the rechargeable accumulators is reliably avoided.

SUMMARY OF THE INVENTION

The above mentioned task is accomplished, according to the present invention, with a method for operating a recording device powered by at least one rechargeable accumulator. The recording device includes a charger which can be connected and disconnected, a control, a main switch for start-up and shut-down of the recording device, and at least one electric switch for separating the recording device from the accumulator. The recording device is placed into a stand-by state or into an operative state after start-up, if the state of charge of the accumulator is above a limit sufficient for a recording process. The recording device is placed into the stand-by state in which the power consumption of the control is reduced relative to the operative state and the accumulator is charged, if the state of charge of the accumulator is below the limit and the charger is connected. The recording device is placed into the operative state from the stand-by state when an activation signal occurs, if the state of charge of the accumulator is above the limit. The recording device is placed into the stand-by state from the operative state when a deactivation signal occurs. Finally, the recording device is placed in the electrically shut off state by the electric switch, when the state of charge of the accumulator is below the limit and the charger is shut off.

Placeing the control into power-saving mode (i.e., stand-by state) is possible, for example, in that semiconductor elements of the control are switched over to the tri-state mode. In a correspondingly structured processor which monitors the control, the cycle frequency can be reduced to lower the power consumption. An example of such a processor is the DMOS processor M 68000 described in the essay "Apples Tragbarer: Spät kommt er, doch er kommt [Apple's Portable: Better Late than Never]" in the Frankfurter Allgemeine Zeitung on Sep. 26, 1989, page T1.

When the recording device is started up, it is first placed into the operative state if the accumulator has a sufficient charge. From this state, if no recording process takes place within a comparatively short period of time (e.g. several seconds) the recording device is placed into the stand-by state by the deactivation signal. Alternatively, the recording device could also be placed first into the stand-by state when it is started up, and placed from this state into the operative state by the activation signal. Since the recording device is only in the operative state when a recording process has been announced (by start-up or by the activation signal), and otherwise is in the stand-by state, which is significantly more advantageous in terms of power consumption, a significant reduction in the power consumption of the recording device is achieved. This reduces the discharge speed of the accumulators, which results in a significantly more desirable discharge curve. In addition, if the charger is connected, the accumulator is recharged during the stand-by state, so that the accumulator is not operated in the range of extensive discharge. The recording device is placed into the electrically shut off state if the state of charge of the accumulator is below the limit and the charger is disconnected thereby reliably avoiding deep discharge of the accumulator.

A further reduction in the power consumption of the recording device is achieved by placing the recording device into the electrically shut off state when the recording device has remained in the stand-by state, without interruption, for a waiting time which can be predetermined. This guarantees automatic shut-off of the recording device, for example for the case that the user has already completed his work and has forgotten to shut the recording device off. The waiting time can optionally be predetermined by the user, so that the behavior of the recording device in this regard can be individually adapted to the needs of the user. When the electric switch is open, an extremely slight discharge of the power storage, which is determined by the inverse current of the electric switch and the current for the control logic of the electric switch, is all that needs to be considered. Using a semiconductor switch having as low an inverse current as possible as the electric switch is advantageous. This requirement is met, for example, by a SIPMOS field effect transistor (FET).

An advantageous further development of the method according to the present invention provides that the deactivation signal is generated if transfer of data to a data interface of the recording device has not taken place during a time period which can be predetermined.

Another advantageous further development of the method according to the present invention consists of the fact that the activation signal is generated if data are provided for transfer to the data interface of the recording device. In this way, a decision criterion as to whether the recording device is to be placed into or maintained in an operative state or to be placed into the stand-by state, which may significantly reduce power consumption, is made available in simple manner. The activation signal can furthermore be generated when a key of the control panel of the recording device or of a device corresponding the with recording device via the data interface is pressed.

The state of charge of the accumulator may be monitored in particularly simple manner, in terms of circuit technology, since the charge of the accumulator is determined by measurement of its output voltage.

Since the discharge curve of commercially available accumulators is not linear, but rather is characterized by a relatively sudden and steep drop of the output voltage before complete discharge (deep discharge), the state of charge of the accumulator can be assessed in simple manner, in that its state of charge is determined by measurement of its output voltage before and after a recording process and difference formation of the measured output voltages. In this way, the risk of deep discharge can be avoided in particularly reliable manner, and furthermore, whether or not a sufficient state of charge of the accumulator for a subsequent printing process exists can be ascertained.

BRIEF DESCRIPTION OF THE DRAWING

The present invention is explained in greater detail in the following, on the basis of a drawing.

DETAILED DESCRIPTION

Figure 1:
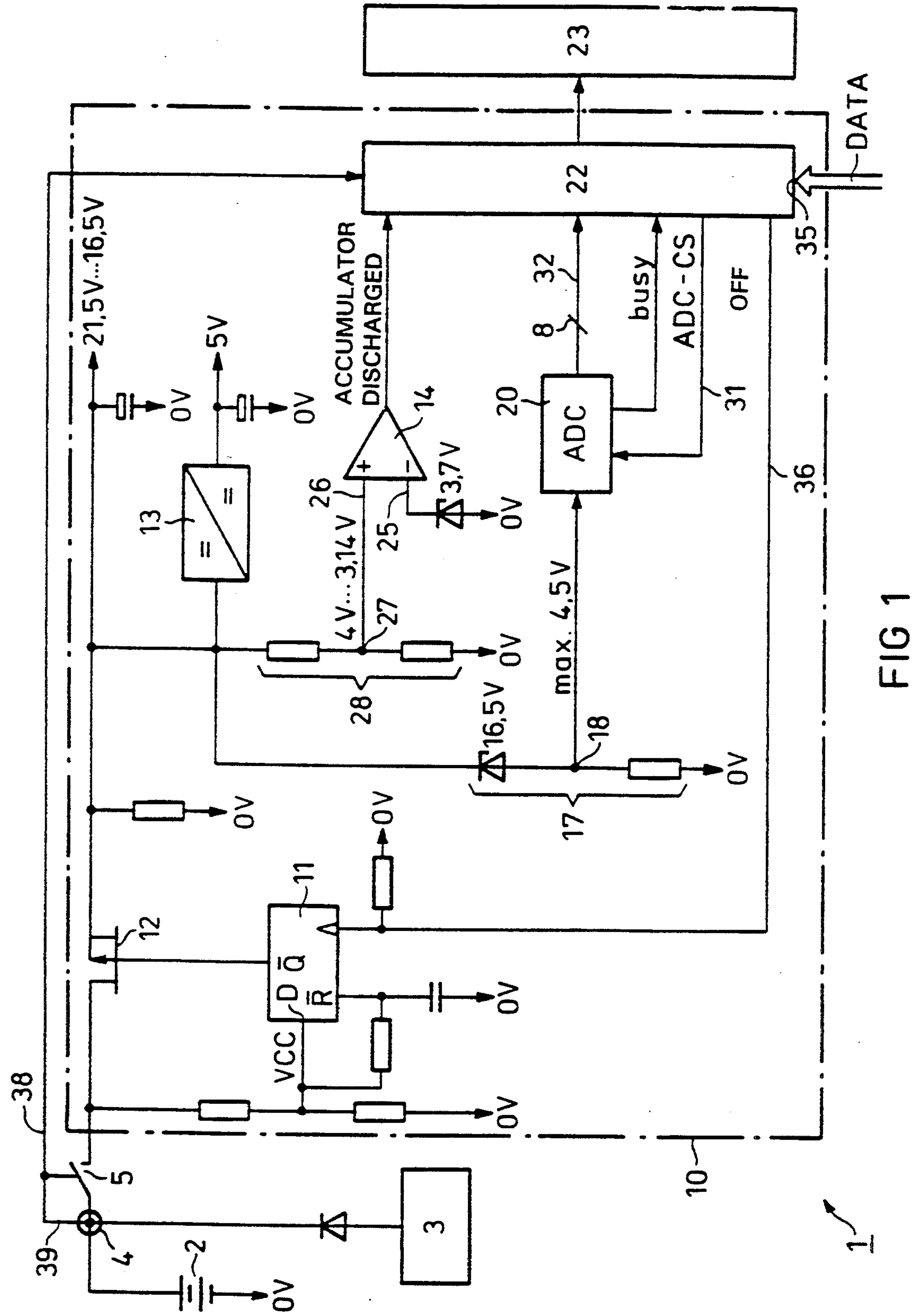
FIG. 1 shows a circuit arrangement for implementing the method according to the present invention.

According to FIG. 1, a recording device 1 is powered by rechargeable accumulators 2. A charger 3 can be attached at a connection point 4 for charging the accumulators 2, and can therefore be connected and disconnected. The accumulators 2 may be connected with the recording device 1 via a main switch 5. A monitoring circuit 10 of the recording device 1 has the essential components of a flip-flop 11, a SIPMOS field effect transistor as an electric switch 12, a voltage converter 13, a comparator 14, a voltage divider 17, the center switch point 18 of which is passed to an input of an analog/digital converter 20, and a control 22. The control 22 applies control signals to a print head 23, based on characters to be printed. At an input 25 of the comparator 14, a reference voltage dropping at a Zener diode is applied, while another input 26 of the comparator 14 is connected with a center switch point 27 of another voltage divider 28. The A/D converter 20 is activated with a selection signal 31 generated by the control 22. The digital output signal of the A/D converter 20 is passed to the control 22 via an 8 bit data line 32. An activation signal is generated in the control 22 when the main switch 5 is activated, and data DATA (recording or control data) arrives at a data interface 35 of the control 22 if—as described below—the state of charge of the accumulators 2 exceeds a predetermined limit (output voltage). A control output of the control 22 is provided to a cycle input of the flip-flop 11 via a control line 36. The control 22 receives status signals regarding the: position of the main switch 5 and regarding whether the charger 3 is connected or disconnected, via signal lines 38 and 39.

After the main switch 5 is closed, the electric switch 12 is closed or placed into the conductive state via the flip-flop 11, so that a voltage (between 3.14 and 4 V) proportional to the output voltage of the accumulators 2 of 16.5 to 21 V occurs at the input 26 of the comparator 14, via the voltage divider 28. If this voltage is below the limit which is selected at 3.7 V by the reference voltage, an output signal ("accumulator discharged") occurs at the output of the comparator 14, which acts as an OFF signal on the cycle input of the flip-flop 11, via the control 22 and the control line 36. With a voltage VCC present at the data input, the OFF signal causes an output signal Q (Low) of the flip-flop 11 and thus "opens" the electric switch 12. If the voltage present at the at the comparator 14 is greater than the reference voltage selected, the recording device 1 is in the operative state after the main switch 5 is closed. If the data DATA are present at the data interface 35 of control 22, these are transmitted to the print head 23, where the voltage of the voltage divider 17 present at the point 18 is passed to the control 22 via the A/D converter 20 before the start of the recording process, and is stored there at least for the duration of the recording process. After the recording process or a segment of a recording process is complete, which is defined by a predetermined page: length of a recording support, for example, the voltage present at the point 18 is again passed to the control 22 for evaluation via the A/D converter 20, and a difference formation with the first voltage value is carried out. If this difference exceeds a predetermined value, which is on the order of 0.1 V, for example, the control 22 generates the OFF signal, which "opens" the electric switch 12 as described above. The range of the discharge curve in which the accumulator is currently being operated can be determined from the voltage difference. When the range of complete discharge, characterized by a steeply dropping discharge curve, is reached, the difference of the output voltages before and after a recording process takes on greater values. In this way, evaluating whether the accumulator is capable of providing the power required for the subsequent planned recording process is also possible.

The recording device 1 is connected with a corresponding data processing device, via the data interface 35 of the control 22, which is structured as a "Centronics" interface, not shown. On a so-called DATASTROBE line of the "Centronics" interface, a signal (DATASTROBE) occurs if data are to be sent to the recording device 1 by the corresponding data processing device. This signal is captured and passed to a threshold detector. If the threshold detector has the signal transmitted on the DATASTROBE line applied to it on the input side, it generates an activation signal, with which the control 22 is activated and starts its data processing and control functions. Now in the activated state, the control 22 monitors the arrival of data. When the data transmission from the corresponding data processing device has ended, a time element in the form of a counter module is started in the control 22. When its counter status reaches a value which can be predetermined, a deactivation signal is given off, which places the control 22 into a power-saving stand-by state. In this stand-by state, the semiconductor elements, with the exception of the threshold detector, are in a high-ohm state (tri-state). Furthermore, the print head 23 is separated from the power storage 2, by means of an electric switch not shown in greater detail. The semiconductor elements are only set back to normal operation from the high-ohm state by the activation signal, where the activation signal can also be generated by pressing an operating key of the; recording device or by closing the main switch 5. In this way, the power consumption of the control 22 is significantly reduced, and discharge of the accumulator is significantly slowed down.

Figure 2:
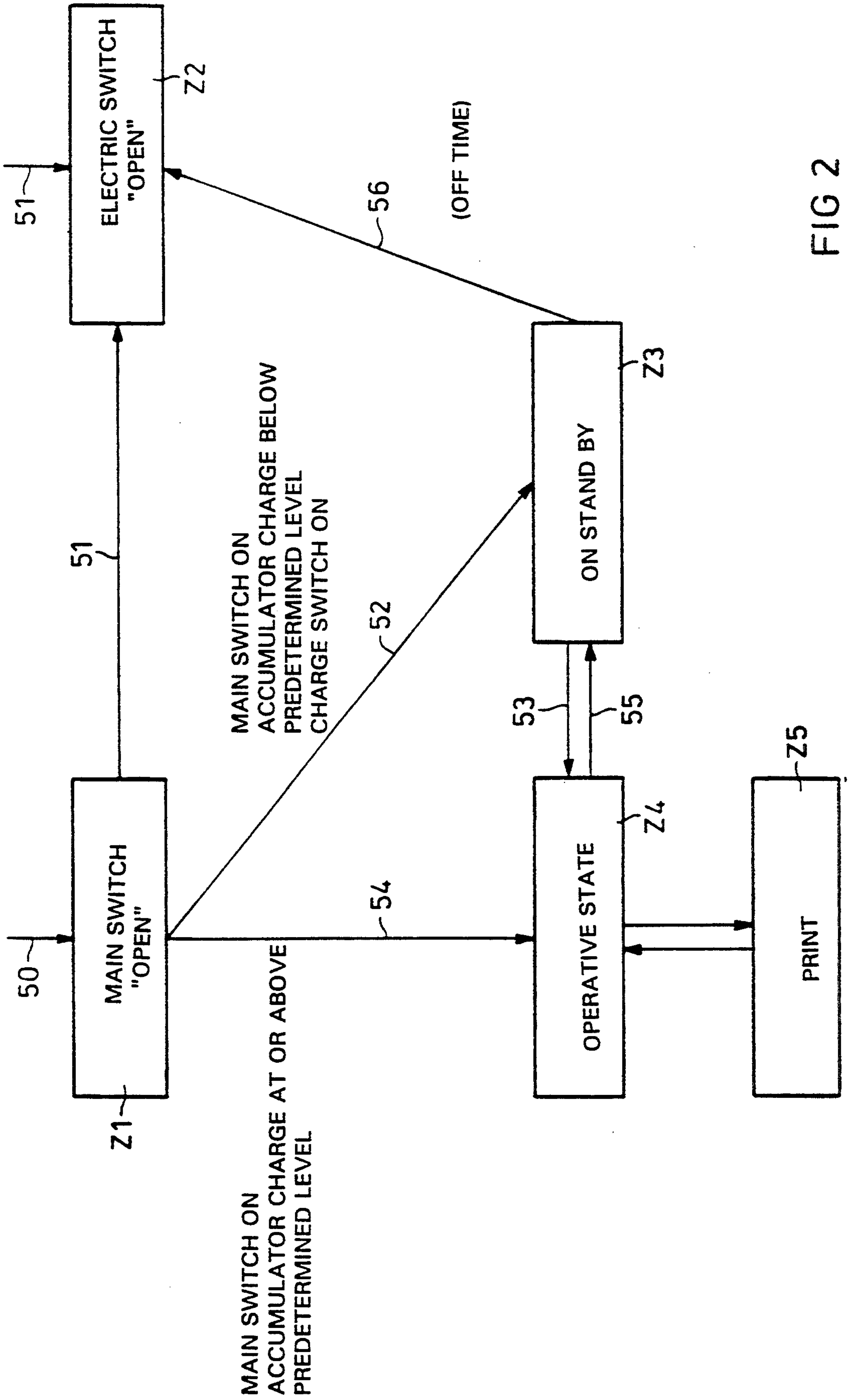
FIG. 2 shows a block schematic of various states of the recording device being operated with the method according to the present invention.

According to FIG. 2, the recording device operated according to the method according to the present invention can take on any one of states Z1 to Z5. States Z2, Z3 and Z4 are particularly important for the method according to the present invention. State Z1 can be reached from all other states Z2 to Z5 symbolized by the arrow 50, by opening the main switch 5 (see. FIG. 1). In an electrically shut off state Z2, the electric switch 12 is "open". This state can be reached directly from the other states Z1, Z3, Z4 and Z5, which is symbolized by the arrow 51. In the stand-by state Z3, the semiconductor elements of the control 22 provided with a tri-state status are placed into the tri-state status. If the charger 3 is connected, the supply of power to the recording device 1 and, if necessary, charging of the accumulators 2 by the charger takes place. From an operative state Z4, the recording device would record data DATA provided at data interface 35. This recording state is referred to as Z5. After the recording process (state Z5) is complete, the recording device returns to the operative state Z4.

If the recording device 1 is put into operation by closing the main switch 5, the state of charge of the accumulators 2 is tested via the comparator 14 (see FIG. 1). If their state of charge is below the limit predetermined by the reference voltage, the control 22 is used to determine whether the charger 3 is connected at the point 4, based on the status signal via the signal line 39. If the charger 3 is shut off, the recording device 1 is placed into the shut-off state Z2 by "opening" the electric switch 12 as the result of the OFF signal of the control 22 (arrow 51). If, on the other hand, the charger is connected, the recording device 1 is placed into the stand-by state and the accumulators 2 are charged by the charger 3 (arrow 52). The charger therefore only has to be sized for the required charging output, and does not have to be designed to cover the peak power requirement necessary during the recording process. The charger 3 can therefore be sized to be relatively small and therefore the recording device incorporating the charger may be produced in a more cost-efficient manner.

If the accumulators 2 have reached a state of charge above the predetermined limit, the recording device is placed into the operative state (Z4) by activating a key on the control panel or by announcing a data transmission from the data processing device connected with it (activation signal) (arrow 53). If, after the main switch 5 is closed, the accumulators 2 have a state of charge that is above the predetermined limit, the recording device 1 is placed directly into the operative state Z4 (arrow 54). If data DATA are provided to the control 22 at the data interface 35, whether the state of charge of the accumulators 2 is below the limit, which can be predetermined, is monitored during the recording process. Further, the states of charge of the accumulators 2 before the start and after completion of the printing process are compared in the manner described in connection with FIG. 1. If the recording device is in the operative state Z4 for a period of time, which can be predetermined, without data for recording reaching the data interface 35 of the recording device 1, the control 22 generates the deactivation signal and the recording device is placed into the stand-by state Z3 from the operative state Z4 (arrow 55). If the recording device has remained in the stand-by state Z3, without interruption, for a predeterminable waiting time, the control 22 generates the OFF signal (off time) using a delay element and opens the electric switch 12, which causes the recording device 1 to be placed into the shut-off state Z2 (arrow 56).

We claim:

1. A method for operating a recording device powered by at least one rechargeable accumulator and having a charger which can be connected and disconnected, a control, a main switch for start-up and shut-down of the recording device and at least one electric switch for electrically separating the recording device from the accumulator and further having an electrically shut-off state, a stand-by state, and an operative state comprising the steps of:
   a) placing the recording device into the operative state after start-up, if the state of the charge of the accumulator is above a limit;
   b) placing the recording device into a stand-by state following start-up, if the state of charge of the accumulator is below the limit and the charger is connected thereby
      i) reducing the power consumption of the control relative to the operative state; and
      ii) charging the accumulator;
   c) placing the recording device into the operative state from the stand-by state when an activation signal occurs if the state of the charge of the accumulator is above the limit;
   d) placing the recording device in the stand-by state from the operative state when a deactivation signal occurs;
   e) placing the recording device into an electrically shut-off state via the electric switch when the state of charge of the accumulator is below the limit and the charger is shut off.

2. The method claimed in claim 1, further including the step of
   f) placing the recording device into the electrically shut off state (Z2) from the stand-by state (Z3), if the recording device has remained in the stand-by state (Z3), without interruption, for a predeterminable time.

3. The method claimed in claim 1 further including the step of
   f) generating the deactivation signal if transfer of data to a data interface of the recording device has not occurred during a predeterminable time period.

4. The method claimed in claim 2 further including the step of
   g) generating the deactivation signal if transfer of data to a data interface of the recording device has not occurred during a predeterminable time period.

5. The method claimed in claim 1 further including the step of
   f) generating the activation signal if data are provided for transfer to a data interface of the recording device.

6. The method claimed in claim 2 further including the step of
   g) generating the activation signal if data are provided for transfer to a data interface of the recording device.

7. The method claimed in claim 3 further including the step of g) generating the activation signal if data are provided for transfer to a data interface of the recording device.

8. The method claimed in claim 4 further including the step of h) generating the activation signal if data are provided for transfer to a data interface of the recording device.

9. The method claimed in claim 1 wherein the state of charge of the accumulator is determined by measuring its output voltage.

10. The method claimed in claim 2 wherein the state of charge of the accumulator is determined by measuring; its output voltage.

11. The method claimed in claim 3 wherein the state of charge of the accumulator is determined by measuring its output voltage.

12. The method claimed in claim 4 wherein the state of charge of the accumulator is determined by measuring its output voltage.

13. The method claimed in claim 5 wherein the state of charge of the accumulator is determined by measuring its output voltage.

14. The method claimed in claim 6 wherein the state of charge of the accumulator is determined by measuring its output voltage.

15. The method claimed in claim 7 wherein the state of charge of the accumulator is determined by measuring its output voltage.

16. The method claimed in claim 8 wherein the state of charge of the accumulator is determined by measuring its output voltage.

17. The method claimed in claim 1 further comprising steps of:

sampling the state of charge of the accumulator before and after a recording process; and determining a difference between the state of charge of the accumulator before the recording process and after the recording process.

18. The method claimed in claim 2 further comprising steps of:

sampling the state of charge of the accumulator before and after a recording process; and determining a difference between the state of the charge of the accumulator before the recording process and after the recording process.

19. The method claimed in claim 3 further comprising steps of:

sampling the state of charge of the accumulator before and after a recording process;

determining a difference between the state of the charge of the accumulator before the recording process and after the recording process.

20. The method claimed in claim 4 further comprising steps of:

sampling the state of charge of the accumulator before and after a recording process;

determining a difference between the state of the charge of the accumulator before the recording process and after the recording process.

21. The method claimed in claim 5 further comprising steps of:

sampling the state of charge of the accumulator before and after a recording process;

determining a difference between the state of the charge of the accumulator before the recording process and after the recording process.

22. The method claimed in claim 15 further comprising steps of:

sampling the state of charge of the accumulator before and after a recording process; and determining a difference between the state of the charge of the accumulator before the recording process and after the recording process.

23. The method claimed in claim 7 further comprising steps of:

sampling the state of charge of the accumulator before and after a recording process; and determining a difference between the state of the charge of the accumulator before the recording process and after the recording process.

24. The method claimed in claim 8 further comprising steps of:

sampling the state of charge of the accumulator before and after a recording process; and determining a difference between the state of the charge of the accumulator before the recording process and after the recording process.

25. The method of claim 17 further comprising a step of opening the at least one electric switch when the difference exceeds a predetermined limit.

* * * * *

UNITED STATES PATENT AND TRADEMARK OFFICE

CERTIFICATE OF CORRECTION

PATENT NO. : 5,449,238

DATED : September 12, 1995

INVENTOR(S) : Ngoc Q. Pham, et al

It is certified that error appears in the above-indentified patent and that said Letters Patent is hereby corrected as shown below:

Column 8, Claim 22, line 25, delete "15" and insert --6--.

Signed and Sealed this

Seventeenth Day of September, 1996

Attest:

BRUCE LEHMAN

*Attesting Officer*

*Commissioner of Patents and Trademarks*